United States Patent [19]

Kügler et al.

[11] Patent Number: 5,408,489
[45] Date of Patent: Apr. 18, 1995

[54] OPTICAL LAYER FOR EXCIMER LASER

[75] Inventors: Eduard Kügler; Roland Pfefferkorn, both of Feldkirch, Austria

[73] Assignee: Balzers Aktiengesellschaft, Liechtenstein

[21] Appl. No.: 33,858

[22] Filed: Mar. 19, 1993

[51] Int. Cl.$^6$ ............................................. H01S 3/22
[52] U.S. Cl. ........................................ 372/57; 359/361
[58] Field of Search .................. 372/57; 359/359, 361

[56] References Cited

U.S. PATENT DOCUMENTS

| | | | |
|---|---|---|---|
| 4,142,958 | 3/1979 | Wei et al. | 204/192 P |
| 4,556,599 | 12/1985 | Sato et al. | 359/359 |
| 4,689,794 | 8/1987 | Brosnan | 372/18 |
| 4,856,019 | 8/1989 | Miyata et al. | 372/57 |
| 5,069,968 | 12/1991 | Nietering | 359/359 |
| 5,089,743 | 2/1992 | Okuda et al. | 359/359 |

OTHER PUBLICATIONS

Absorption-influenced laser damage resistance of Ta2O5 coatings By Wolf, OPTCA ACTA, 1986, vol. 33, No. 7, 919–924.

CRC Handbook of Chemistry and Physics, 55th Edition 1974–1975 (no month).

Bergmann et al., Lehrbuchder Experimentalphysilew, vol. III, Optic, Ed. B. pp. 43–1 (1987) (no month available).

Effects of Oxygen Content on the optical Properties of Tantalum Oxide . . . , by Demiryont, Applied Optics/vol. 24, No. 4/15 Feb. 1985.

Technology and applications of broad-beam ion sources in sputtering Part II. Applications; by Harper, J.Vac.Sci. Technol., 21(3), Sep./Oct. 1982.

Optische Beschichtungen fur Hochleistungslaser Optical . . . Risiau Jun. 1989.

The Optical Properties of Thin Films of Tantalum Pentoxide Zirconium Dioxide, Khawaja, Jun. 13, 1975.

Journal of the Electrochemical Society, Selected Properties of Pyrolytic Ta2O5 Films, Knausenberger, Jul. 1973.

Materials for Optical Coatings in the Ultraviolet; by Rainer, Applied Optics/vol. 24, No. 4/15 Feb. 1985.

Primary Examiner—Georgia Y. Epps
Attorney, Agent, or Firm—Notaro & Michalos

[57] ABSTRACT

An optical layer and arrangements with such a layer are proposed which is predominantly of $Ta_2O_5$ and having an absorption constant for ultra-violet light less than 0.0075 for light of 308 nm. Such a layer is produced by ion-beam sputtering of a target which target is predominantly made of $Ta_2O_5$.

18 Claims, 3 Drawing Sheets

OPTICAL LAYER FOR EXCIMER LASER

FIELD AND BACKGROUND OF THE INVENTION

The present invention is directed to an optical layer which is predominantly of $Ta_2O_5$, an optical element comprising such a layer, an apparatus comprising at least one XeCl excimer laser, an apparatus comprising at least one HeCd- or $N_2$-gas laser and on a process for producing such an optical layer.

Tantalum pentoxide as material for optical layers would have several advantages, namely
- —good mechanical and optical stability, being hard and withstanding environmental stress and further forming a very dense layer;
- —good plasma stability in that $Ta_2O_5$ does not change its stochiometry under plasma conditions;
- —extremely low scattering of light; and
- —withstands very high temperatures.

It is well-known that especially for high energy laser applications, absorption of energy by layers of optical elements must be kept as low as possible so that such elements withstand the high energy density.

From R. Wolf et al., "Absorption-influenced laser damage resistance of $Ta_2O_5$ coatings", Optica Acta, 1986, vol. 33, no. 7, 919–924, it is known that (see e.g. FIG. 1) the laser damage resistance measured for light of 530 nm generally rises with falling absorption. It is especially noted that this laser damage resistance for tantalum pentoxide layers steeply rises down to an absorption value of approximately $6.5 \cdot 10^{-3}$ and that below this value the laser damage resistance rises less steeply with falling absorption. The absorption of the $Ta_2O_5$ layers, produced by resistance evaporation, is varied by varying oxygen partial pressure during layer deposition.

In the following specification absorption is specified by the absorption constant k with $k = n \cdot \kappa$ wherein n is the refractive index and $\kappa$ is the extinction coefficient (see Bergmann, Schaefer, Lehrbuch der Experimentalphysik (handbook of Experimental Physics), vol. III, Optic, edition 8, de Gruyter, p. 263 and footnote to p. 279).

Khawaja et al., Thin Solid Films, 30 (1975), 361–369, investigate the optical behaviour of sputtered tantalum pentoxide films.

From the measurements of reflectance and transmittance at varying wave-lengths of light, the curve of absorption constant k with respect to wave-length is calculated and drawn in FIG. 3 of this reference.

Thereby the authors conclude (p. 366) that such calculation of the absorption constant for wave-lengths greater than 300 nm is to be regarded as not reliable since measuring errors of reflectance and transmittance in the ‰ range suffice to produce errors of the absorption constant in the order of 100%.

Therefore, the authors calculate the absorption constant k by formulae (3) or (4) in Khawaja et al. Formula (3) applies for energies up to 4.51 eV which accords to 274 nm, and thus for light wave-lengths larger than 274 nm, formula (4) for energies beyond 4.51 eV and thus for wave-lengths smaller than 274 nm.

The absorption constant k so calculated is plotted in graph (d) of FIG. 7 and is, as the authors conclude, in good agreement with the experimental data.

The present inventors have calculated the absorption constant $k = k_1 + k_2$ (4) and $k = k_1$ (3) in the respective wave-length bands above and below 274 nm according to the formulae (3) or (4) respectively of Khawaja et al. with

| | |
|---|---|
| $E_G =$ | 4.15eV; |
| $E_{g1} =$ | 4.51eV; |
| $C_2 =$ | 6.2 and |
| $C_3 =$ | 8.2 | and with the values of n measured according to FIG. 7 of the cited reference. In FIG. 1 of the present application, the results are shown.

Therefrom it may be seen that for wave-lengths larger than 274 nm the absorption constant k predicted by Khawaja et al. would e.g. be:

$2.7 \cdot 10^{-4}$ for $\lambda = 300$ nm, $1.5 \cdot 10^{-2}$ for $\lambda = 308$ nm, $1.3 \cdot 10^{-1}$ for $\lambda = 325$ nm.

It may further be seen that the predicted absorption coefficient k of sputtered tantalum pentoxide films would significantly rise with rising $\lambda$ departing from the absorption band at 298 nm according to an energy of 4.15 eV. Thus, a minimal absorption constant k would be expected at 298 nm raising to values larger than 0.01 at 308 nm.

With respect to energy to wave-length conversion, please refer to Handbook of Chemistry and Physics, CRC Press, 55th edition, 1974–1975, F-223.

From W. H. Knausenberger et al., Selected Properties of Pyrolytic $Ta_2O_5$ Films, Journal of the Electrochemical Society, July 1973, p. 927 ff., it is known that pyrolytic $Ta_2O_5$ shows an absorption peak at 4.20 eV energy which accords to 295 nm wave-length. In FIG. 6 of that reference the values of the absorption coefficient $\alpha$ as measured is plotted over photon energy. Departing from the formula $$k = \frac{\alpha \cdot \lambda}{4\pi}$$

known e.g. from Handbook of Experimental Physics mentioned above, Knausenberger get the following results:

| $\lambda$ | k |
|---|---|
| 331 | 0.012 |
| 323 | 0.013 |
| 313 | 0.016 |
| 307 | 0.018 |
| 303 | 0.02 |
| 299 | 0.022 |
| 291 | 0.032 |

They show a rising slope of absorption constant from wave-lengths well above 300 nm towards lower wave-length values. At about 308 nm, k is measured to be about 0.018. The wave-length/absorption constant course resulting from Knausenberger is shown in FIG. 2 of the present application.

From the U.S. Pat. No. 4,142,958, layers of a quarter wave-length thickness of 500–800 Å are known, thus for applications for light within the infrared region. These layers are reported to present losses in the range of 0.01% for that infrared light and are made of a high index material as of tantalum pentoxide or titanium dioxide. These layers are made according to U.S. Pat. No. 4,142,958 by a reactive ion-beam sputtering process whereby titanium dioxide layers are reported to be made by sputtering a titanium dioxide target. As shown by the absorption constant courses of Khawaja and Knausenberger it is not possible from these percentage values to predict the behaviour of $Ta_2O_5$ referenced here at wave-lengths of about 300 nm.

From F. Rainer et al., "Materials for optical coatings in the ultra-violet", Applied Optics, Vol. 24, No. 4/15 February 1985, pages 496 ff., it is known to use coating materials as $ZrO_2$, $Y_2O_3$, $HfO_2$, $Sc_2O_3$, MgO, $Al_2O_3$, $SiO_2$ for light in the ultra-violet region at 248 nm. Thereby the coatings which are subjected to investigation are deposited by electron beam evaporation. For light at 248 nm attenuation coefficients are reported <0.001.

According to H. Demiryont et al., "Effects of oxygen content on the optical properties of tantalum oxide films deposited by ion-beam sputtering", Applied Optics, Vol. 24, No. 4/15 February 1985, pages 490 ff., it has been found that tantalum pentoxide layers have an extinction coefficient of approximately 0.02 (according to k of about 0.04) at 300 nm light dropping to about 0.01 (according to about 0.02) at 310 nm and dropping then asymptotically towards $10^{-3}$ at about 375 nm. The layers which are investigated by Demiryont are produced by ion-beam sputtering technique as e.g. described in J. M. E. Harper et al., "Technology and applications of broad-beam ion sources used in sputtering", part II, Applications, J. Vac. Sci. Technol., 21(3), September/October 1982, page 727, and in J. L. Vossen et al., "Thin film processes", Academic Press Inc., New York 1978, page 175.

The layers which were investigated by Demiryont were produced by using a target of metallic tantalum.

Nevertheless and summarizing the above, the U.S. Pat. No. 4,142,958 and the mentioned reference to Khawaja and to Knausenberger and their teaching utilized to predict tantalum pentoxide optical behaviour in the 300 nm wave-length region seem to stand against an application of such a material layer for applications where in this very light-wave range smallest possible absorption is necessitated so as e.g. and especially for high power laser applications which emit light in the said wave-length area.

SUMMARY OF THE INVENTION

It is an object of the present invention to provide an optical layer which is made at least predominantly of tantalum pentoxide and which has a significantly lower absorption constant compared with known tantalum pentoxide layers and astonishingly lower than would have been expected from known investigations about that material.

This is resolved by the inventive optical layer being at least predominantly of $Ta_2O_5$ and having an improved absorption constant for ultra-violet light, namely having an absorption constant less than 0.0075 for light of 308 nm wave-length.

It is believed that the inventive $Ta_2O_5$ optical layer may be realized inventively with an absorption constant down to 1.E-6 at least to 1.E-5.

It is a further object of the invention to even further lower the said absorption constant to become less than 0.005 for light of the said 308 nm wave-length.

With respect to laser damage threshold, D. Ristau et al., "Optische Beschichtungen für Hochleistungslaser, Optical Coatings for High Power Lasers", Laser und Optoelektronik 21(4)/1989, p. 52, report that it appears that single layers which have been produced by ion-beam sputtering show a significant lower damage threshold compared with such layers produced in a conventional manner, i.e. by evaporation.

In opposition to the prediction of the quality of ion-beam sputtered optical layers in the above mentioned reference, it has astonishingly been found that the above object of significant reduction of absorption constant may be inventively achieved by such a layer being processed by ion-beam sputtering.

Thereby, preferably ion-beam sputtering is performed by sputtering a target which is predominantly of tantalum pentoxide.

It is a further object of the present invention to provide an optical element for ultra-violet light, whereat at least one layer is of tantalum pentoxide and whereat that layer exhibits in the ultra-violet light region a significantly improved absorption constant behaviour compared with known and predicted absorption behaviour of such layers.

This is achieved by the optical element for ultra-violet light which comprises at least one optical layer which is predominantly of $Ta_2O_5$ and which has an absorption constant which is less than 0.0075 if used for light of 308 nm wave-length, whereby said layer has a thickness according to an integer number of $\lambda/4$ which optical element further comprises at least one further layer of an integer number of $\lambda/4$ optical thickness made of a material of lower refractive index than the refractive index of $Ta_2O_5$. The exploitation of the higher refractive index of tantalum pentoxide thereby leads to thin quarter wave-length layers. This enables to use thin electron beam sensitive resists in litographic application. Such thin layers are especially useful in dry etching applications.

It is a further object to provide an apparatus which comprises at least one XeCl excimer laser or at least one HeCd- or $N_2$-gas laser and at least one optical layer being at least predominantly of tantalum pentoxide exposed to a predominant part of power of said laser, which tantalum pentoxide layer having an absorption constant which is less than 0.0075 for light of 308 nm wave-length, thereby providing for practicable damage threshold.

In view of the opposite prediction of the behaviour of optical layers produce by ion-beam sputtering according to the above mentioned reference of Ristau et al., it is today concluded by the inventors of the present invention that ion-beam sputtering technique, as described in the above mentioned reference of J. M. E. Harper et al., is astonishingly probably the basis to realize the inventively low absorption constant tantalum pentoxide layers and most probably if the said ion-beam sputtering occurs with a target which is predominantly of tantalum pentoxide itself, although it may not be excluded that ion-beam sputtering of a metallic target would not lead to similar good results or even other coating techniques if appropriately controlled.

It is a further object of the present invention to provide for a process for producing the improved tantalum pentoxide, which process comprises ion-beam sputtering of a target being predominantly of tantalum pentoxide.

BRIEF DESCRIPTION OF THE DRAWINGS

The present invention will be better understood and objects other than those set forth above will become apparent when consideration is given to the following detailed description thereof.

Such description makes reference to the annexed drawings, wherein.

DETAILED DESCRIPTION OF THE INVENTION IN A TODAY PREFERRED MODE OF REALIZATION

Figure 1:
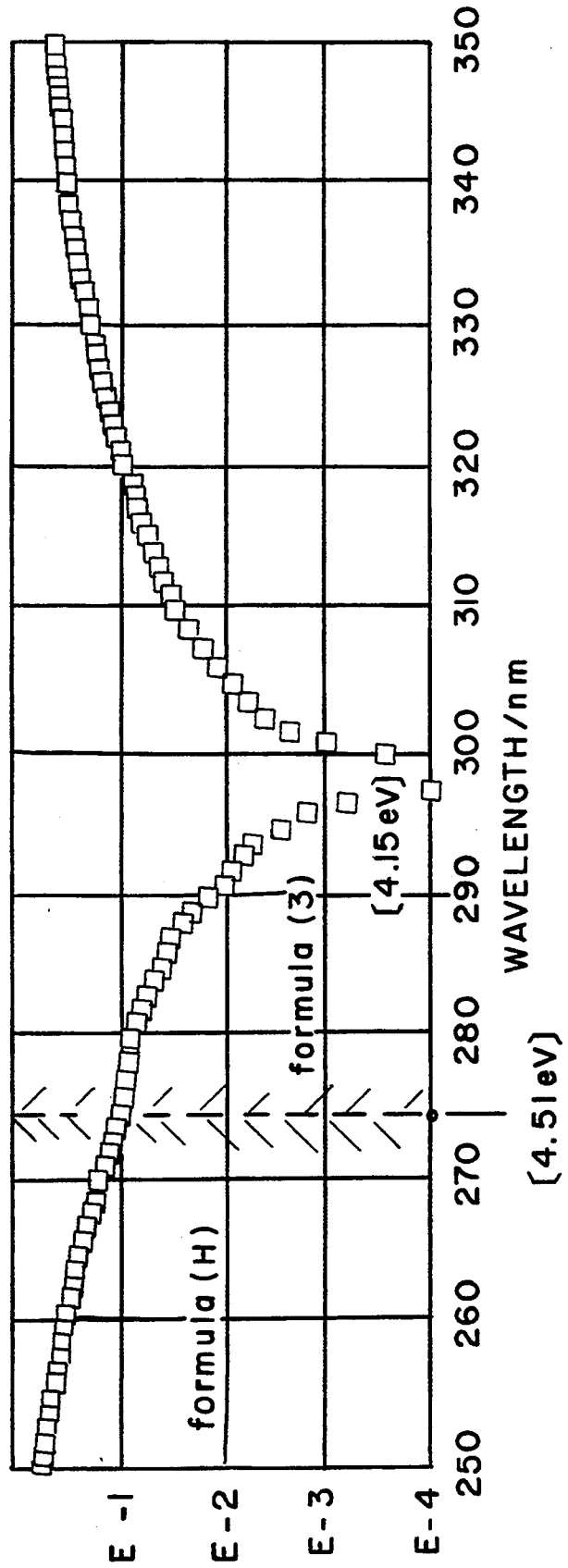
FIG. 1 shows the absorption constant behaviour of tantalum pentoxide in the 300 nm light-wave region as predicted by calculation following the teaching of the mentioned reference of Khawaja et al. and performed by the present inventors.
Figure 2:
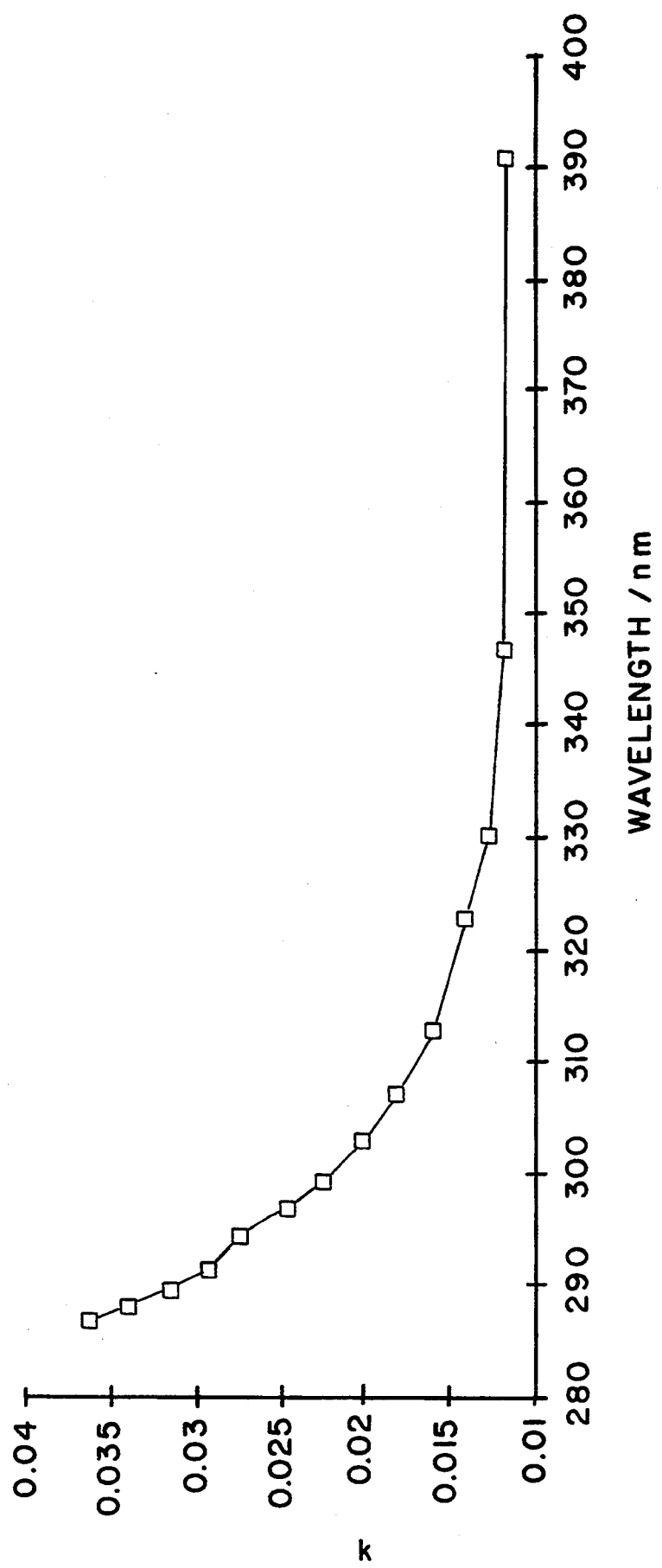
FIG. 2 a plot of absorption constant k versus wave-length according to the $\alpha^2$ to photon energy plot in FIG. 6 of the Knausenberger reference.
Figure 3:
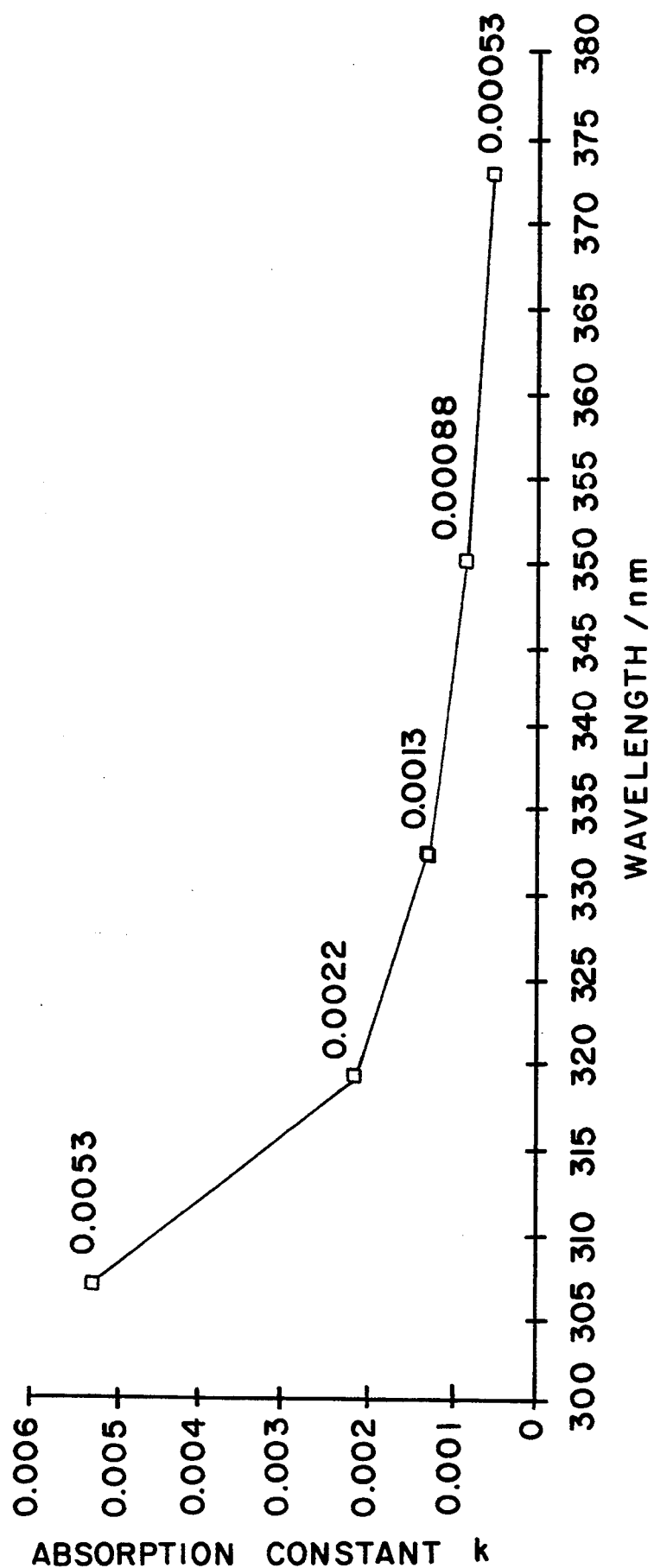
FIG. 3 shows a plot of absorption constant versus wave-length of an inventive tantalum pentoxide layer inventively produced.

With an ion-beam sputtering technique known to the man skilled in the art, there was sputtered a target made of at least 99% $Ta_2O_5$. By this technique there was formed a thin layer on either an $SiO_2$ or an $Al_2O_3$ substrate. The resulting course of absorption constant is shown in FIG. 3 as a function of wave-length in nm. For light of 308 nm the produced layer had an absorption constant of 0.0048. Even better results were achieved with constants at 308 nm down to 0.003. There is thus realized a $Ta_2O_5$ layer or, generally $Ta_2O_5$, which has an absorption constant clearly below 0.0075 for light of 308 nm.

With $Ta_2O_5$ layers of such improved absorption constant high energy density applications become possible. It becomes evident that by the novel $Ta_2O_5$ layer a layer is realized with significantly lower absorption constant over the 300 nm to 380 nm wave-length band, making high energy applications possible for light especially in this entire band.

As it was mentioned, the inventive layer comprises predominantly $Ta_2O_5$. For specific control of its optical characteristics it may further comprise at least one of the following materials: $ZrO_2$, $Y_2O_3$, $HfO_2$, $Sc_2O_3$, MgO, $Al_2O_3$, $SiO_2$. Accordingly and as was mentioned, the target material, inventively used is predominantly of $Ta_2O_5$, but may comprise at least one of the following materials: $ZrO_2$, $Y_2O_3$, $HfO_2$, $Sc_2O_3$, MgO, $Al_2O_3$, $SiO_2$.

Based on the above described improved $Ta_2O_5$ layer there was further realized an optical element in that there was sputtered from the target predominantly of $Ta_2O_5$ a $\lambda/4$ $Ta_2O_5$ layer on a substrate of $SiO_2$ or $Al_2O_3$, preferably of $SiO_2$. Afterward there was sputtered on said $Ta_2O_5$ $\lambda/4$ layer a further layer of $SiO_2$ or of $Al_2O_3$, preferably again of $SiO_2$, with a thickness of $\lambda/4$, thus producing a double layer of $Ta_2O_5$ and $SiO_2$ or $Al_2O_3$.

With $Ta_2O_5$ and $SiO_2$ double layers for light of 308 nm, seven such double layers of $\lambda/4$ each single layer, were sputtered on an $SiO_2$ substrate providing for a novel optical element substrate with resulting reflection of approximately 99%.

This optical element made of at least one double layer of two materials on a substrate, one of said two materials being predominantly $Ta_2O_5$, the other being $SiO_2$ or $Al_2O_3$, may clearly be used especially for high energy density application of light of 308 nm or between 300 nm and 380 nm wave-length and has very small thickness and very low light absorption compared with optical elements of other materials used for such wave-lengths up to now. Clearly the inventive optical element may comprise layers of $$n' \cdot \frac{\lambda}{4} \text{ thickness,}$$

thickness, where n' is an integer, e.g. to realize higher order filters. As the inventive low absorbing layer and optical element allows reflection or transmission of high energy beams, they are inventively combined in apparatus with XeCl excimer lasers, $N_2$- or HeCd-gas lasers, where such layers and/or optical elements co-operate with the beam of such a laser.

We claim:

1. An optical layer being at least predominantly of $Ta_2O_5$ having an improved absorption constant for ultra-violet light, said layer having an absorption constant of less than 0.0075 for light of 308 nm wave-length.

2. The optical layer of claim 1, having an absorption constant less than 0.005 for light of 308 nm wave-length.

3. The optical layer of claim 1, being made by the process of ion-beam sputtering.

4. The layer of claim 3, wherein a target being predominantly of $Ta_2O_5$ is ion-beam sputtered.

5. The layer of claim 1, comprising further at least one of the following materials: $ZrO_2$, $Y_2O_3$, $HfO_2$, $Sc_2O_3$, MgO, $Al_2O_3$, $SiO_2$.

6. The layer of claim 5, being processed by ion-beam sputtering of a target, said target being predominantly of $Ta_2O_5$ and comprising further at least one of the following materials: $ZrO_2$, $Y_2O_3$, $HfO_2$, $Sc_2O_3$, MgO, $Al_2O_3$, $SiO_2$.

7. The layer of claim 1, being of at least 99% $Ta_2O_5$.

8. The layer of claim 2, said target being of at least 99% $Ta_2O_5$.

9. An optical element for ultra-violet light comprising at least one optical layer being predominantly of $Ta_2O_5$ and having an absorption constant less than 0.0075 when used for light of 308 nm wave-length, said layer having a thickness of $n' \cdot \lambda/4$, n' being an integer, further comprising at least one further layer of $n'' \cdot \lambda/4$ optical thickness, n'' being an integer, made of a material of lower refractive index than the refractive index of $Ta_2O_5$.

10. The optical element of claim 9, the $\lambda/4$ optical thickness of said at least two layers being $\lambda/4$ for light of 308 nm wave-length.

11. The optical element of claim 9, said further layer being made of at least one of $SiO_2$ and of $Al_2O_3$.

12. The optical element of claim 9, said optical layer and said further layer forming a double layer, comprising at least two of said double layers.

13. The optical element of claim 12, comprising at least six double layers and having a reflection of at least 95% for light of 308 nm wave-length.

14. An apparatus comprising at least one XeCl excimer laser which generates power, and at least one optical layer being at least predominantly of $Ta_2O_5$ and being exposed to the power of said laser and having an absorption constant less than 0.0075 for light of 308 nm wave-length.

15. The apparatus of claim 14, said at least one layer is made by ion-beam sputtering of a target, said target being predominantly of $Ta_2O_5$.

16. An apparatus comprising at least one of an HeCd- or $N_2$-gas laser which generates power and at least one optical layer being at least predominantly of $Ta_2O_5$ and being exposed to the power of said laser and having an absorption constant less than 0.0075 for light of 308 nm wave-length.

17. The apparatus of claim 16, said at least one layer is made by ion-beam sputtering of a target, said target being predominantly of $Ta_2O_5$.

18. A process for producing an optical layer being predominantly of $Ta_2O_5$ and having an absorption constant of less than 0.0075 for light of 308 nm wave-length, said process comprising ion-beam sputtering of a target, said target being predominantly of $Ta_2O_5$.

* * * * *